United States Patent Office

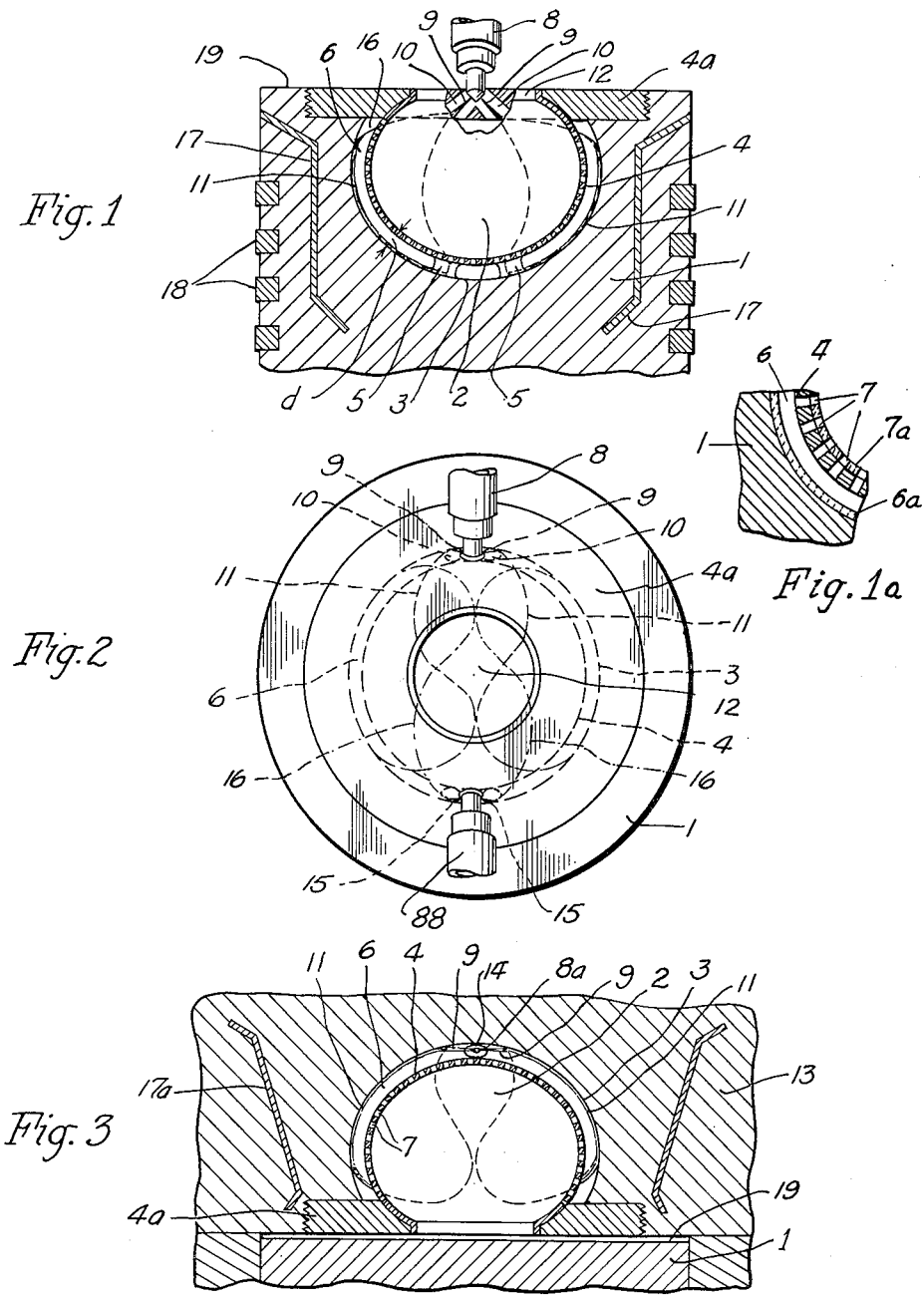

2,979,043
Patented Apr. 11, 1961

2,979,043

INTERNAL COMBUSTION ENGINE AND METHOD OF OPERATING SAME

Siegfried Meurer and Erhard Mühlberg, Nurnberg, Germany, assignors to Maschinenfabrik Augsburg-Nurnberg A.G., Nurnberg, Germany Filed Nov. 12, 1957, Ser. No. 695,618

Claims priority, application Germany Nov. 17, 1956

15 Claims. (Cl. 123—25)

This invention relates to an internal combustion engine and the method of operating the engine for recovering the heat lost in one phase of the operation of the engine and recycling the heat for use during combustion occurring in a following phase of operation. The invention further relates to a novel engine construction. In order to improve the combustion in engines operating according to the diesel or Otto system, it is known to inject water or water vapor into the combustion chambers in order to improve the combustion. This is substantially due to the fact that steam catalyses and thus accelerates the reactions occurring in the combustion chamber. Also, in a contrary manner, possibilities are known for carrying out an immediate reaction between the water vapor and a hydrocarbon. In the latter case, the oxygen content in the water immediately reacts with the hydrocarbon. However, such immediate reactions easily occur only at temperatures approximately in the range of 1000° C. The reaction between the water and hydrocarbon produces carbon monoxide and hydrogen, and this reaction depends upon the supply of heat and therefore is an endothermic reaction. Therefore, the supplied heat later appears as a heat value increase in the burning of the produced carbon monoxide and hydrogen with oxygen and air.

The object of this invention is to use this heat value increase for the cyclic recovery of heat lost in internal combustion engines. A main feature of the invention lies in that this recovery achieved from the endothermic reaction between the fuel and the water which produces the gas medium for forming the fuel mixed with the air for combustion in the engine, with the heat needed for the endothermic reaction being taken from a place in the cylinder which receives the heat lost in combustion and preferably in a place having contact with the hottest combustion gases.

Thus, preferably, the heat occurring in the combustion gases, which is being immediately withdrawn as a loss of heat, is again made useful for a fuel mixture being created by an enthodthermic reaction process.

According to other features of the invention, the blending of the reaction mediums, fuel and water, takes place in a special reaction chamber which communicates through a gas permeable means with the main combustion chamber and which is positioned immediately adjacent a spot exposed to the heat lost in the combustion of the gases.

This reaction chamber can be, for example, a part of a double-walled combustion chamber in a manner somewhat resembling combustion chambers constructed for other purposes. Fuel and water are injected into the reaction chamber so that they form a film on the wall of the chamber in such a way that the medium can quickly evarporate in the short time period available. The injection of the fuel and water can be in the combined form of a fuel and water emulsion, or the fuel and water can be separately injected. To increase the speed of the evaporation of the film, the reaction chamber is given the form of a narrow almost capillary hollow space which communicates with the main combustion chamber through a gas permeable means, such as a porous partition or liner. Because the heat available from the heat loss positions may be at a temperature level which is not sufficient for the immediate reaction between the water and hydrocarbon, the required temperature level in the reaction chamber is lowered by well-known catalytic means, as, for example, by catalysts such as platinum, nickel, and aluminum-hydroxide, which will permit reaction temperatures within the temperature range permissible for the construction of the engine. The catalytic material is preferably applied to the wall of the reaction chamber, but can also be applied in addition to the inside wall of the main combustion chamber. The fuel and water injection time is at a crank angle range between the dead center of the change between the intake and exhaust gases and the ignition dead center position.

The endothermic reaction between the fuel and water in the interior of the engine does not take place continuously but is limited to the fuel intermittently introduced into the reaction chamber and cylinder, respectively, during each combustion operation. The heat loss coming from the following combustion of the reaction products instead of being entirely lost is substantially used for satisfying the demand of additional heat for the next following water-fuel reaction. Therefore, the amount of heat transferred to the wall of the reaction chamber is re-introduced into the combustion process by reason of the increase in heat value of the newly created reaction products. The advantage achieved is in that the otherwise lost heat is not conducted into the cooling water but serves for decreasing the specific fuel consumption by means of the effective increase in heat value. This effect can be enhanced by heat insulating means surrounding the reaction chamber in order to avoid the dissipation of the combustion heat from the outside vicinity of the fuel-water reaction zone. The products of the water-fuel reaction occurring in the reaction chamber and passed as gases into the combustion chamber in the form of carbon monoxide and hydrogen are then mixed with turbulent air in the combustion chamber, ignited, and then burned. Various means can be provided for igniting the gases.

For performing the process of the invention, it is suitable that a symmetrical combustion chamber in the form of a hemisphere or a cylinder is used because such combustion chamber can be insulated by simple means, and also permits the forming of a constricted outlet from the combustion chamber for the purpose of creating a good air swirl. Furthermore, with a rotating air swirl, such constriction produces an increase in velocity of the swirl which improves the mixing of the gases with the intake air.

It is immaterial as to whether the combustion chamber is formed in the piston or in the cylinder head or partly in both the piston and cylinder head. Furthermore, the process of the invention is applicable to either two-stroke or four-stroke engines, which will differ only in the manner in which the gas is changed in the cylinder.

The mode of operation of this process is as follows:

(A) The fuel together with the water is introduced into the reaction chamber during a crank angle time between the dead center position of the change from exhaust to intake air and the ignition dead center position by being applied as a liquid film on the wall of the chamber.

(B) The wall of the reaction chamber intermittently absorbs heat from the preceding combustion stroke, and this heat with the aid of a catalyst causes an endothermic reaction between the fuel and water vapor by which carbon monoxide and hydrogen are formed. The reaction products pass through the porous wall of the reaction chamber into the combustion chamber, and at the end of the compression stroke, the reaction products are mixed with the intake combustion air by heretofore air moving means.

(C) By any known ignition means, such as a spark plug, catalytic ignition, or the injection of self-igniting fuel, the fuel-air mixture is fired and burned.

The means by which the objects of the invention are obtained are disclosed more fully with reference to the accompanying drawings, in which:

Figure 1 is a cross-sectional view through a portion of a piston, including the reaction chamber, and showing the position of the fuel injection nozzle;

Figure 1a is an enlarged detailed view of a part of Figure 1;

Figure 2 is a plan view of Figure 1; and

Figure 3 is a cross-sectional view through a portion of a cylinder head containing the reaction chamber mounted above the piston cylinder.

As shown in Figures 1 and 2, the piston 1 contains a double-walled combustion chamber 2, the outer wall 3 of which constitutes the surface of the combustion chamber opening in the piston body, and the inner wall 4 of which is the surface of an inserted cup-shaped liner. Combustion chamber 2 preferably is in the shape of a body of rotation. Liner 4 is separated from outer wall 3 by a space $d$, with the liner either being completely free of wall 3 or supported by spacer members 5. A simple manner of mounting the liner is by means of a recess in the piston head into which an annular circular plate 4a is threadedly fitted to hold liner 4. This liner therefore separates the combustion chamber opening in the piston head into an inner main combustion chamber 2 and a narrow reaction chamber 6. Because the heat loss in the piston is always fast enough to be effective as the reaction heat in the reaction chamber 6, Figure 1 shows an exaggerated distance $d$, for purposes of illustration, between liner 4 and outer wall 3. This space is actually very small and almost a capillary space. Liner 4 is either composed of a porous material or is provided with numerous small holes 7. The degree of porosity or perforation is fixed so as to form a gas permeable passage from chamber 6 into chamber 2.

The walls of reaction chamber 6 are covered with a porous coating 6a which can be composed of ceramic or metal ceramic and serves as a carrier for a catalyst. Such catalyst consists of platinum, nickel, aluminum-hydroxide, or similar materials.

In the same manner, the surface of liner 4 facing main combustion chamber 2 can also be covered with a catalyst 7a.

In accordance with the invention, fuel is injected from nozzle 8 into reaction chamber 6 in the form of one or more jets 9 which preferably are directed tangentially onto the wall of chamber 6 through suitable openings 10 in plate 4a and the inserted cup-shaped liner 4 so that the fuel covers the wall of chamber 6 as thin film layers 11 over an area as large as possible. When the combustion chamber is formed in the piston, as in Figures 1 and 2, nozzle 8 is mounted close to outer wall 3 of the combustion chamber. When the combustion chamber is formed in the cylinder head 13, as in Figure 3, the injection nozzle indicated by its end 8a is positioned near the vertex of the bottom of the combustion chamber so that fuel is injected through an opening 14 to form films 11, as in Figures 1 and 2.

Water is injected into reaction chamber 6 simultaneously with the injection of the fuel. This can be done by injecting an emulsion of fuel and water through the same openings in nozzle 8. Otherwise the nozzle 8 can be provided with separate bores and orifices so that the fuel and water are separately injected and co-mingled in reaction chamber 6. Again, if necessary, two nozzles 8 and 88 can be used for the simultaneous and separate injection of the fuel and water, one nozzle injecting the fuel and the other the water. In this case, the second nozzle 88 is positioned opposite the first nozzle 8, as shown in Figure 2. The water jets 15 emerging from nozzle 88 into reaction chamber 6 form water films 16 upon the wall 3 of the reaction chamber with water films 16 overlapping fuel films 11. A heat insulating ring 17 mounted in the piston body forms a barrier against the transfer of heat from the combustion chamber zone toward the piston rings 18 and there adjacent cylinder block or cylinder head circulating cooling water. In the modification of Figure 3, a corresponding heat insulating ring 17a is mounted in the cylinder head 13 and surrounds the combustion chamber 2. The total heat occurring on the upper surface 19 of the piston and on the wall of chamber 6, respectively, is thus preserved and is available for carrying out the water-fuel reaction in reaction chamber 6. Because of the reaction process taking place in chamber 6, an intensive outside cooling of the adjacent piston and cylinder portions is not necessary as the reaction process is endothermic and withdraws heat from the surrounding heated surfaces, and it is a feature of this invention to maintain as high as is possible, within allowable construction limits, a high temperature level in the material surrounding the reaction chamber and combustion chamber, respectively.

The effect produced by the invention is as follows.

After fuel and water have been injected, for example, before the start of the compression stroke as described into chamber 6, a fuel and water reaction occurs in chamber 6 by the withdrawal of heat from the surrounding walls. In this reaction, the hydrocarbon in the fuel and the water according to the Wartenberg formula are split into carbon monoxide (CO) and hydrogen (H). This formula for the preparation of hydrogen is:

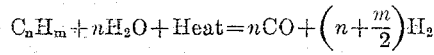

$$C_nH_m + nH_2O + \text{Heat} = nCO + \left(n + \frac{m}{2}\right)H_2$$

that is to say that a hydrocarbon plus water and heat is reacted into carbon monoxide and hydrogen. These gases pass through the porous liner 4 into main combustion chamber 2 in which the turbulent air movement ordinarily produced during the compression stroke mixes with the gases, this air movement being either in the form of a swirling air rotation or a general air turbulence. The reaction gases mix quickly with the intake air, and the ignition can be caused in any desired manner, for example, by means of compression self-ignition, electric or catalytic ignition, and also by means of the injection of a self-igniting fuel.

Having now described the means by which the objects of the invention are obtained, we claim:

1. A process for forming gaseous fuels with a recovery of heat in the interior of an internal combustion engine having a combustion space and a reaction chamber in said space, comprising heating the reaction chamber in the engine with the hottest combustion gases occurring during a combustion stroke, introducing fuel and water into said chamber while still highly heated by said gases, endothermically reacting the fuel and water to form carbon monoxide and hydrogen by heat withdrawn from the previously heated chamber, and then mixing the hydrogen and carbon monoxide with air, igniting the mixture and burning the same.

2. A process as in claim 1, said fuel and water being introduced into said reaction chamber communicating with said combustion space adjacent a wall portion repeatedly heated by the burning gases of previous engine combustion strokes.

3. A process as in claim 2, comprising introducing the fuel and water into the reaction chamber as jets tangentially applied to the wall of the reaction chamber and forming films thereon.

4. A process as in claim 3, comprising introducing a mixture of fuel and water.

5. A process as in claim 3, comprising introducing separate jets of fuel and water.

6. A process as in claim 1, comprising reacting the fuel and water in the presence of a metal catalyst to lower the reaction temperature to allowable constructural limits.

7. A process as in claim 1, said fuel and water being introduced into the reaction chamber during a crank angle time between the dead center position of the change from exhaust to intake air and the ignition dead center position.

8. A process as in claim 7, further comprising mixing the products of the endothermic reaction with turbulent intake air in the combustion space, and then igniting and burning the mixture of gases and air.

9. In an internal combustion engine having a cylinder, a combustion chamber communicating with said cylinder and having a double wall composed of an inner and an outer wall, said inner wall comprising a gas permeable liner inserted into the combustion chamber and spaced from the outer wall to form a reaction chamber therebetween, means for injecting fuel and water into the reaction chamber tangential to the wall thereof to form a liquid film on the reaction chamber wall over a large area, whereby the fuel and water are endothermically reacted into carbon monoxide and hydrogen and pass through said liner into the main combustion chamber, mixed with intake air, ignited and burned.

10. In an engine as in claim 9, further comprising a metallic catalytic coating on the wall of the reaction chamber.

11. In an engine as in claim 10, further comprising a catalytic coating on the inner combustion chamber facing surface of said liner.

12. In an engine as in claim 11, said combustion chamber having a constricted outlet, and means for introducing intake air into the combustion chamber with a velocity increase through said constricted outlet.

13. In an engine as in claim 12, said combustion chamber having the form of a body of rotation.

14. In an engine as in claim 13, further comprising a barrier of heat insulating material surrounding said reaction and combustion chambers.

15. In an engine as in claim 14, further comprising a fuel nozzle opening through said liner for depositing a film of fuel upon said outer wall.

References Cited in the file of this patent

UNITED STATES PATENTS

| 1,078,816 | Wright | Nov. 18, 1913 |
| 2,777,430 | Meurer | Jan. 15, 1957 |

FOREIGN PATENTS

| 665,127 | France | Apr. 30, 1929 |
| 1,018,753 | France | Oct. 22, 1952 |
| 1,127,385 | France | Aug. 6, 1956 |